(12) United States Patent
Xu et al.

(10) Patent No.: US 11,615,614 B2
(45) Date of Patent: Mar. 28, 2023

(54) METHOD AND SYSTEM FOR DIAGNOSING PLANT DISEASE AND INSECT PEST

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 274 days.

(21) Appl. No.: 16/953,301

(22) Filed: Nov. 19, 2020

(65) Prior Publication Data
US 2021/0248370 A1     Aug. 12, 2021

(30) Foreign Application Priority Data
Feb. 11, 2020  (CN) .......................... 202010086827.4

(51) Int. Cl.
| | |
|---|---|
| *G06V 20/10* | (2022.01) |
| *A01G 7/06* | (2006.01) |
| *G06K 9/62* | (2022.01) |
| *G06F 18/22* | (2023.01) |
| *G06F 18/214* | (2023.01) |

(52) U.S. Cl.
CPC ............. *G06V 20/188* (2022.01); *A01G 7/06* (2013.01); *G06F 18/214* (2023.01); *G06F 18/22* (2023.01)

(58) Field of Classification Search
CPC .... G06V 20/188; G06V 10/764; G06V 10/82; A01G 7/06; G06K 9/6201; G06K 9/6256; G06N 3/0454; G01N 2021/8466
See application file for complete search history.

(56) References Cited

U.S. PATENT DOCUMENTS

2017/0287082 A1\* 10/2017 Karube .................. G06Q 50/02

FOREIGN PATENT DOCUMENTS

CN           111105393 A  \*  5/2020

\* cited by examiner

*Primary Examiner* — Bobbak Safaipour
*Assistant Examiner* — Wassim Mahrouka
(74) *Attorney, Agent, or Firm* — JCIP Global Inc.

(57) ABSTRACT

A method and a system for diagnosing a plant disease and an insect pest are provided. The method includes: obtaining an plant image; determining a candidate specie and candidate disease and insect pest information corresponding to at least part of the candidate specie according to the plant image when a current diagnosis mode is a passive diagnosis mode; screening out the candidate disease and insect pest information of the candidate specie according to a first preset condition for the candidate specie with the corresponding candidate disease and insect pest information; and outputting at least part of remaining disease and insect pest information after screening out when there is the remaining disease and insect pest information.

18 Claims, 11 Drawing Sheets

METHOD AND SYSTEM FOR DIAGNOSING PLANT DISEASE AND INSECT PEST

CROSS-REFERENCE TO RELATED APPLICATION

This application claims the priority benefit of China application serial no. 202010086827.4, filed on Feb. 11, 2020. The entirety of the above-mentioned patent application is hereby incorporated by reference herein and made a part of this specification.

BACKGROUND

Technical Field

The disclosure relates to the field of computer technology, and in particular to a method and a system for diagnosing a plant disease and an insect pest.

Description of Related Art

During the growth process of plants, issues such as diseases and insect pests are often encountered. At present, such issues are usually found and dealt with by professional management personnel. However, if the relevant personnel fail to detect the disease and insect pest, it is likely to cause serious adverse effects on the growth of the plant.

SUMMARY

The disclosure provides a method for diagnosing a plant disease and an insect pest, which includes the following steps. A plant image is obtained. When a current diagnosis mode is a passive diagnosis mode, a candidate specie and candidate disease and insect pest information corresponding to at least part of the candidate specie are determined according to the plant image. For the candidate specie with the corresponding candidate disease and insect pest information, the candidate disease and insect pest information of the candidate specie is screened out according to a first preset condition. After screening out, if there is remaining disease and insect pest information, at least part of the remaining disease and insect pest information is output.

In some embodiments, determining the candidate specie and the candidate disease and insect pest information corresponding to the at least part of the candidate specie according to the plant image includes the following steps. Whether the candidate specie is in a preset specie set is judged. When the candidate specie is in the preset specie set, the candidate disease and insect pest information corresponding to the candidate specie is determined according to the plant image and the candidate specie. When the candidate specie is not in the preset specie set, no candidate disease and insect pest information corresponding to the candidate specie is determined for the candidate specie.

In some embodiments, screening out the candidate disease and insect pest information of the candidate specie according to the first preset condition includes the following step. When there are at least two candidate disease and insect pest information corresponding to the same candidate specie, according to a descending order of diagnostic confidence of the candidate disease and insect pest information, the candidate disease and pest information of the candidate specie is screened out according to the first preset condition until the remaining disease and insect pest information for output is filtered out or all candidate disease and insect pest information corresponding to the candidate specie is screened out.

In some embodiments, screening out the candidate disease and insect pest information of the candidate specie according to the first preset condition includes the following steps. The diagnostic confidence of the candidate disease and insect pest information is compared with a first preset confidence. When the diagnostic confidence is less than the first preset confidence, the candidate disease and insect pest information is screened out.

In some embodiments, screening out the candidate disease and insect pest information of the candidate specie according to the first preset condition includes the following steps. Whether the candidate specie is in the preset specie set is judged. When the candidate specie is not in the preset specie set, the candidate disease and insect pest information corresponding to the candidate specie is screened out.

In some embodiments, screening out the candidate disease and insect pest information of the candidate specie according to the first preset condition includes the following steps. Whether the candidate specie and the candidate disease and insect pest information corresponding to the candidate specie are mutually exclusive is judged. When the candidate specie and the candidate disease and insect pest information corresponding to the candidate specie are mutually exclusive, the candidate disease and insect pest information is screened out.

In some embodiments, screening out the candidate disease and insect pest information of the candidate specie according to the first preset condition includes the following steps. A diagnostic accuracy of the candidate disease and insect pest information is compared with a preset accuracy. When the diagnostic accuracy is less than the preset accuracy, the candidate disease and insect pest information is screened out.

In some embodiments, the method further includes the following steps. When the current diagnosis mode is an active diagnosis mode, the candidate specie and candidate diagnosis information corresponding to the candidate specie is determined according to the plant image. The candidate diagnosis information includes disease and insect pest information or no detected disease and insect pest information. At least one result diagnosis information is filtered out from the candidate diagnosis information according to a second preset condition. The result diagnosis information is output.

In some embodiments, filtering out the at least one result diagnosis information from the candidate diagnosis information according to the second preset condition includes the following steps. A specie confidence of the candidate specie is compared with the second preset confidence, and diagnostic confidence of the candidate diagnosis information corresponding to the candidate specie is compared with a third preset confidence. When the specie confidence is greater than or equal to the second preset confidence and the diagnostic confidence is greater than or equal to the third preset confidence, the candidate specie is filtered out as a first pending specie, and the candidate diagnosis information is filtered out as a first pending diagnosis information.

In some embodiments, filtering out the at least one result diagnosis information from the candidate diagnosis information according to the second preset condition includes the following steps. Whether the first pending specie and the first pending diagnosis information corresponding to the first pending specie are mutually exclusive is judged. When the first pending specie and the first pending diagnosis information corresponding to the first pending specie are mutually exclusive, the first pending diagnosis information is screened out.

In some embodiments, there are at least two plant images, and the candidate specie and the candidate diagnosis information corresponding to the candidate specie are determined according to each plant image.

Filtering out the at least one result diagnosis information from the candidate diagnosis information according to the second preset condition includes the following steps. Respectively for each plant image, the first pending diagnosis information with the maximum diagnostic confidence corresponding to the plant image is filtered out as second pending diagnosis information of the plant image. According to the third preset condition, the result diagnosis information is filtered out from the second pending diagnosis information of all plant images.

In some embodiments, the method further includes the following steps. When the current diagnosis mode is the active diagnosis mode, the candidate specie corresponding to each plant image is respectively determined according to multiple plant images. Respectively for each plant image, the candidate specie with the maximum specie confidence is filtered out as a second pending specie corresponding to the plant image. In the second pending specie corresponding to each plant image, the second pending specie with the maximum number is filtered out as a result specie, or the second pending specie with the maximum number and the maximum specie confidence is filtered out as the result specie. The result diagnosis information corresponding to the result specie is determined and output.

In some embodiments, determining the candidate specie according to the plant image includes the following step. The candidate specie is determined according to the plant image using a trained specie recognition model. The trained specie recognition model is a neural network model.

In some embodiments, training a specie recognition model includes the following steps. A first sample set of plant images marked with specie of a first preset number is obtained. A first proportion of plant images is determined from the first sample set as a first training set. The first training set is used to train the specie recognition model. When a first training accuracy is greater than or equal to a first preset accuracy, the training ends and the trained specie recognition model is obtained.

In some embodiments, the method further includes the following steps. A second proportion of plant images is determined from the first sample set as a first test set. A first model accuracy of the trained specie recognition model is determined using the first test set. When the first model accuracy is less than a second preset accuracy, the first training set and/or the specie recognition model are adjusted for retraining.

In some embodiments, determining the candidate disease and insect pest information according to the plant image includes the following steps. The candidate diagnosis information is determined according to the plant image using a trained disease and insect pest diagnosis model. The candidate disease and insect pest information is obtained according to the candidate diagnosis information. The trained disease and insect pest diagnosis model is a neural network model.

In some embodiments, training a disease and insect pest diagnosis model includes the following steps. A second sample set of plant images marked with diagnosis information of a second preset number is obtained. A third proportion of plant images is determined from the second sample set as a second training set. The disease and insect pest diagnosis model is trained using the second training set. When a second training accuracy is greater than or equal to a third preset accuracy, the training ends and the trained disease and insect pest diagnosis model is obtained.

In some embodiments, the method further includes the following steps. A fourth proportion of plant images is determined from the second sample set as a second test set. A second model accuracy of the trained disease and insect pest diagnosis model is determined using the second test set. When the second model accuracy is less than a fourth preset accuracy, the second training set and/or the disease and insect pest diagnosis model are adjusted for retraining.

According to another aspect of the disclosure, a system for diagnosing a plant disease and an insect pest is provided. The system includes a processor and a memory. The memory stores an instruction. When the instruction is executed by the processor, the steps of the method for diagnosing the plant disease and the insect pest are implemented. The method includes the following steps. The plant image is obtained. When the current diagnosis mode is the passive diagnosis mode, the candidate specie and the candidate disease and insect pest information corresponding to the at least part of the candidate specie are determined according to the plant image. For the candidate specie with the corresponding candidate disease and insect pest information, the candidate disease and insect pest information of the candidate specie is screened out according to the first preset condition. After screening out, if there is the remaining disease and insect pest information, the at least part of the remaining disease and insect pest information is output.

According to another aspect of the disclosure, a non-transitory computer-readable storage medium is provided. The computer-readable storage medium stores an instruction. When the instruction is executed by a processor, the steps of the method for diagnosing the plant disease and the insect pest are implemented. The method includes the following steps. The plant image is obtained. When the current diagnosis mode is the passive diagnosis mode, the candidate specie and the candidate disease and insect pest information corresponding to the at least part of the candidate specie are determined according to the plant image. For the candidate specie with the corresponding candidate disease and insect pest information, the candidate disease and insect pest information of the candidate specie is screened out according to the first preset condition. After screening out, if there is the remaining disease and insect pest information, the at least part of the remaining disease and insect pest information is output.

The exemplary embodiments of the disclosure are described in detail through the following with reference to the accompanying drawings, so that other features and advantages of the disclosure are clearer.

BRIEF DESCRIPTION OF THE DRAWINGS

The drawings constituting a part of the specification describe the embodiments of the disclosure, and together with the specification, serve to explain the principle of the disclosure.

With reference to the accompanying drawings, the disclosure may be understood more clearly according to the following detailed descriptions.

Figure 1:
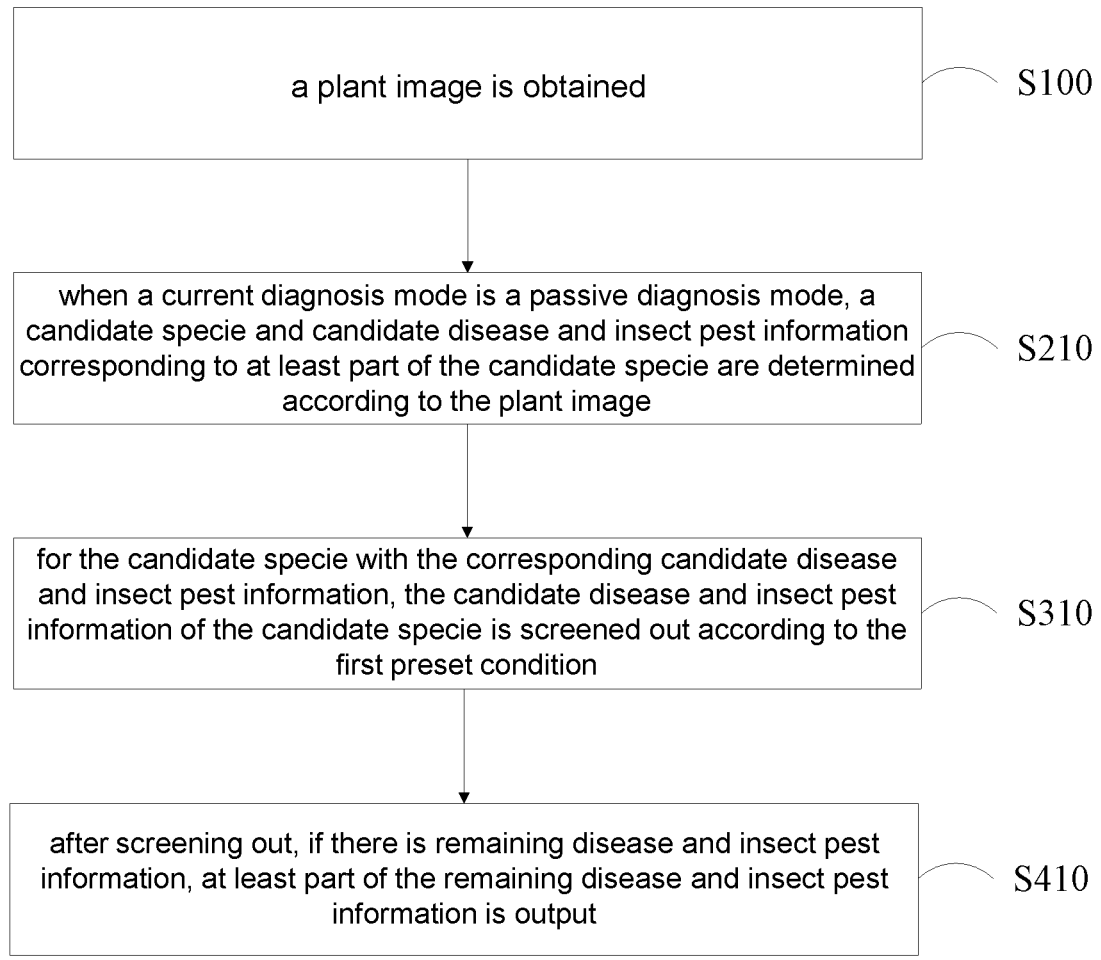
FIG. 1 shows a flowchart of a method for diagnosing a plant disease and an insect pest according to an exemplary embodiment of the disclosure.

It should be noted that in the embodiments described below, the same reference numerals are sometimes used in common between different drawings to denote the same parts or parts with the same functions, and repeated descriptions thereof are omitted. In some cases, similar reference numerals and letters are used to indicate similar items. Therefore, once an item is defined in a drawing, the item does not need to be discussed further in subsequent drawings.

For ease of understanding, the position, size, range, etc. of each structure shown in the drawings and the like may not indicate the actual position, size, range, etc. sometimes. Therefore, the disclosure is not limited to the position, size, range, etc. disclosed in the drawings and the like.

DETAILED DESCRIPTION OF DISCLOSED EMBODIMENTS

Various exemplary embodiments of the disclosure will be described in detail below with reference to the accompanying drawings. It should be noted that unless specifically stated otherwise, the relative arrangement, numerical expressions, and numerical values of the components and steps set forth in the embodiments do not limit the scope of the disclosure.

The following descriptions of at least one exemplary embodiment is actually only illustrative, and in no way serves as any limitation to the disclosure and the application or use thereof. That is to say, the structures and methods in the disclosure are shown in an exemplary manner to illustrate different embodiments of the structures and methods in the disclosure. However, persons skilled in the art will understand that the descriptions only illustrate exemplary ways in which the disclosure can be implemented, rather than exhaustive ways. In addition, the drawings are not necessarily drawn to scale, and some features may be exaggerated to show details of specific components.

The technologies, methods, and equipment known to persons skilled in the art may not be discussed in detail, but where appropriate, the technologies, methods, and equipment should be regarded as parts of the authorization specification.

In all examples shown and discussed here, any specific value should be interpreted as merely exemplary, rather than as a limitation. Therefore, other examples of the exemplary embodiments may have different values.

FIG. 1 shows a flowchart of a method for diagnosing a plant disease and an insect pest according to an exemplary embodiment of the disclosure. The method may be implemented in an application (app) installed on a smart terminal such as a mobile phone or a tablet computer. As shown in FIG. 1, the method may include the following steps.

In Step S100, a plant image is obtained.

In some examples, the plant image uploaded by the user may be directly obtained. In other examples, after receiving an instruction from the user, corresponding prompt information may be generated and output to prompt the user to upload the plant image. Further, the prompt information may also include specific requirements for the plant image, such as prompting the user to upload an entire plant image, a partial plant image of the stem, leaves, or other parts, a partial image of the part with an obvious lesion, etc. In this case, preprocessing such as marking may also be performed on multiple plant images, such as respectively marking the entire plant image, the partial plant images (including marking the plant parts reflected by the plant images), etc. to better recognize a specie or diagnose a disease or an insect pest.

In Step S210, when a current diagnosis mode is a passive diagnosis mode, a candidate specie and candidate disease and insect pest information corresponding to at least part of the candidate specie are determined according to the plant image.

When determining the candidate specie and the candidate disease and insect pest information corresponding to the candidate specie, the candidate specie and the candidate disease and insect pest information corresponding to the plant image may be determined according to each plant image. The candidate specie and the candidate disease and insect pest information corresponding to multiple plant images may also be determined according to the multiple associated plant images.

For a plant image, there may be multiple candidate species. For each candidate specie, there may be multiple possible diseases and insect pests. In some embodiments, the corresponding candidate disease and insect pest information may be determined for each candidate specie. In other embodiments, it is also possible to determine the corresponding candidate disease and insect pest information for only a part of the candidate species to simplify processing.

For example, in some examples, it is possible to further diagnose the disease and the insect pest only for some candidate species with higher specie confidence, so as to generate the candidate disease and insect pest information corresponding to the candidate species, and wait for further filtering. The specie confidence refers to the probability that the specie corresponding to the plant image is the candidate specie.

Alternatively, in other examples, determining the candidate specie and the candidate disease and insect pest information corresponding to at least part of the candidate specie according to the plant image may include the following steps.

In Step S110, whether the candidate specie is in a preset specie set is judged.

In Step S120, when the candidate specie is in the preset specie set, the candidate disease and insect pest information corresponding to the candidate specie is determined according to the plant image and the candidate specie.

In Step S130, when the candidate specie is not in the preset specie set, the candidate disease and insect pest information corresponding to the candidate specie is not determined for the candidate specie.

The species included in the preset specie set are generally common species or important species, and the diagnosis of diseases and insect pests of the species generally has higher accuracy and reliability. In other words, the disease and insect pest information may be determined only for the species, thereby reducing the difficulty of processing, and avoiding the output of inaccurate, unreliable, or unimportant disease and insect pest information to the user.

A trained specie recognition model may be used to determine the candidate specie according to the plant image. The trained specie recognition model may be a neural network model, which is specifically a convolutional neural network model or a residual network model.

The convolutional neural network model is a deep feedforward neural network, which uses the convolution kernel to scan the plant image and extracts the features to be recognized in the plant image, thereby recognizing the features to be recognized of the plant. In addition, during the process of recognizing the plant image, the original plant image may be directly input into the convolutional neural network model without preprocessing the plant image. Compared with other recognition models, the convolutional neural network model has higher recognition accuracy and recognition efficiency.

Compared with the convolutional neural network model, the residual network model has an additional identity mapping layer, which may avoid the saturation or even decline of accuracy as the network depth (the number of layers in the network) increases. The identity mapping function of the identity mapping layer in the residual network model needs to satisfy the condition that the sum of the identity mapping function and the input of the residual network model is equal to the output of the residual network model. After introducing identity mapping, the residual network model changes the output more obviously, so the recognition accuracy and recognition efficiency of the plant species can be greatly improved.

Figure 2:
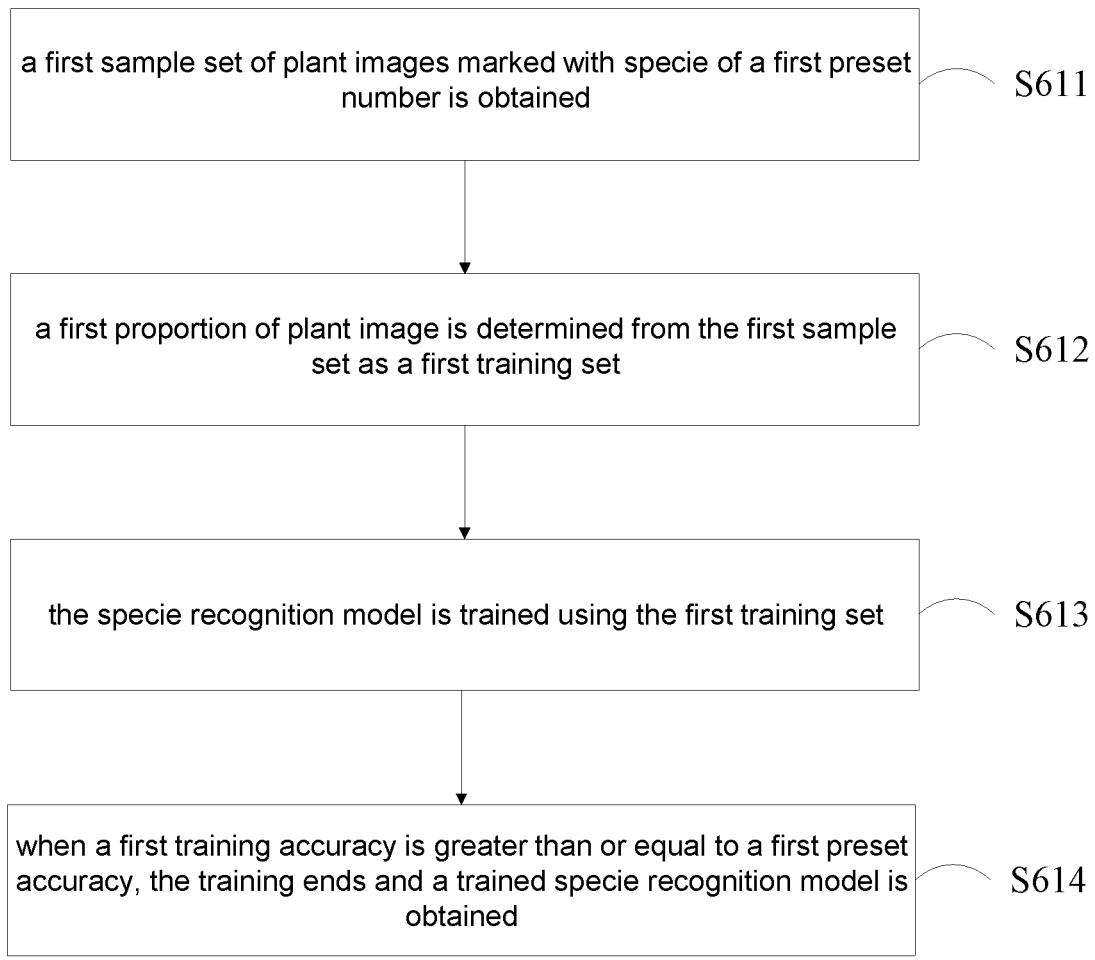
FIG. 2 shows a flowchart of training a specie recognition model according to an exemplary embodiment of the disclosure.

As shown in FIG. 2, training a specie recognition model may include the following steps.

In Step S611, a first sample set of plant images marked with specie of a first preset number is obtained.

In Step S612, a first proportion of plant image is determined from the first sample set as a first training set.

In Step S613, the specie recognition model is trained using the first training set.

In Step S614, when a first training accuracy is greater than or equal to a first preset accuracy, the training ends and a trained specie recognition model is obtained.

Specifically, in the first sample set, a large number of plant images may be included, and each plant image is correspondingly marked with a specie. The plant image is input into the specie recognition model to generate an output specie. Then, according to a comparison result between the output specie and the marked specie, relevant parameters in the specie recognition model may be adjusted, that is, the specie recognition model is trained until the first training accuracy of the specie recognition model is greater than or equal to the first preset accuracy, and the training ends and the trained specie recognition model is obtained.

According to a plant image, the specie recognition model may also output multiple candidate species. Each candidate specie may have a corresponding specie confidence thereof for further analysis and filtering.

Figure 3:
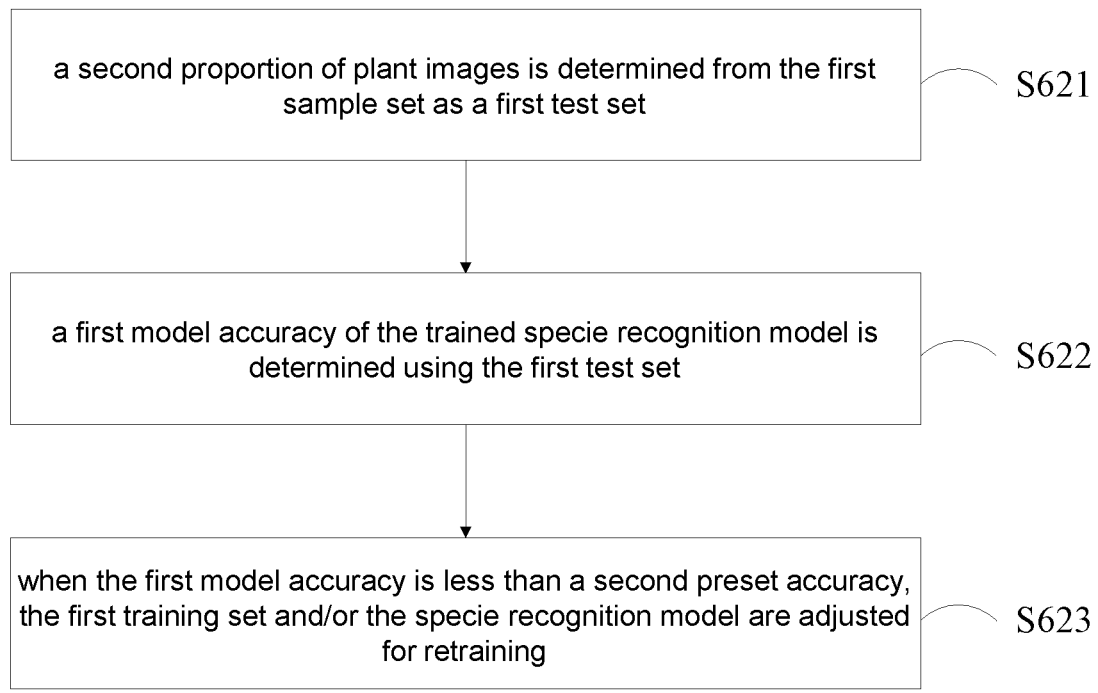
FIG. 3 shows a flowchart of testing a specie recognition model according to an exemplary embodiment of the disclosure.

Further, the trained specie recognition model may also be tested, which may specifically include the following steps, as shown in FIG. 3.

In Step S621, a second proportion of plant images is determined from the first sample set as a first test set.

In Step S622, a first model accuracy of the trained specie recognition model is determined using the first test set.

In Step S623, when the first model accuracy is less than a second preset accuracy, the first training set and/or the specie recognition model are adjusted for retraining.

In general, the plant images in the first test set and the first training set are not exactly the same, so that the first test set may be used to test whether the specie recognition model also has a good recognition effect on plant images outside the first training set. During the test process, the first model accuracy of the specie recognition model is calculated through comparing the output specie generated by the plant images in the first test set with the marked specie. In some examples, the calculation method of the first model accuracy may be the same as the calculation method of the first training accuracy. When the first model accuracy obtained by the test is less than the second preset accuracy, it indicates that the recognition effect of the specie recognition model is not good enough. Therefore, the first training set may be adjusted by specifically, for example, increasing the number of plant images marked with specie in the first training set, adjusting the specie recognition model, or adjusting both of the above. Then, the specie recognition model is retrained to improve the recognition effect thereof. In some embodiments, the second preset accuracy may be set equal to the first preset accuracy.

In the same way, candidate diagnosis information may be determined according to the plant image using a trained disease and insect pest diagnosis model. It should be noted that the diagnosis information may include the disease and insect pest information or no detected disease and insect pest information. Therefore, the candidate disease and insect pest information may be further obtained according to the candidate diagnosis information. The trained disease and insect pest diagnosis model may be a neural network model, which is specifically a convolutional neural network model or a residual network model.

Figure 4:
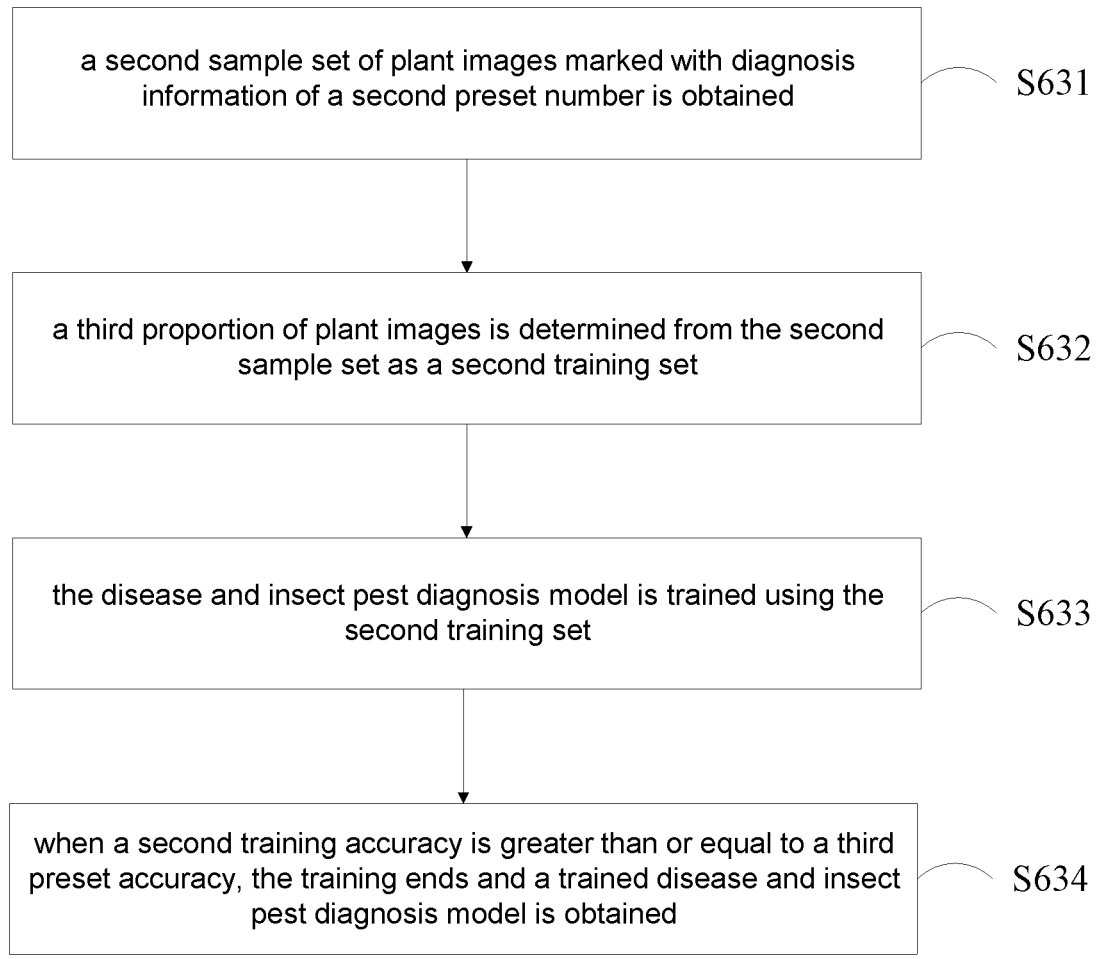
FIG. 4 shows a flowchart of training a disease and insect pest diagnosis model according to an exemplary embodiment of the disclosure.

As shown in FIG. 4, training a disease and insect pest diagnosis model may include the following steps.

In Step S631, a second sample set of plant images marked with diagnosis information of a second preset number is obtained.

In Step S632, a third proportion of plant images is determined from the second sample set as a second training set.

In Step S633, the disease and insect pest diagnosis model is trained using the second training set.

In Step S634, when a second training accuracy is greater than or equal to a third preset accuracy, the training ends and a trained disease and insect pest diagnosis model is obtained.

Specifically, in the second sample set, a large number of plant images may be included, and each plant image is correspondingly marked with diagnosis information. The diagnosis information may be, for example, information of a disease or an insect pest suffered by the plant in the plant image, or no detected disease and insect pest information corresponding to a healthy plant. At least part of the plant images in the second sample set may be the same as the plant images in the first sample set. The plant images are input into the disease and insect pest diagnosis model to generate output diagnosis information. Then, according to a comparison result between the output diagnosis information and the marked diagnosis information, relevant parameters in the disease and insect pest diagnosis model may be adjusted, that is, the disease and insect pest diagnosis model is trained until the second training accuracy of the disease and insect pest diagnosis model is greater than or equal to the third preset accuracy, and the training ends and the trained disease and insect pest diagnosis model is obtained. According to a plant image, the disease and insect pest diagnosis model may output multiple candidate diagnosis information. Each candidate diagnosis information may have a corresponding diagnostic confidence for further analysis and filtering. The diagnostic confidence refers to the probability that the diagnosis information corresponding to the plant image is the candidate diagnosis information.

Figure 5:
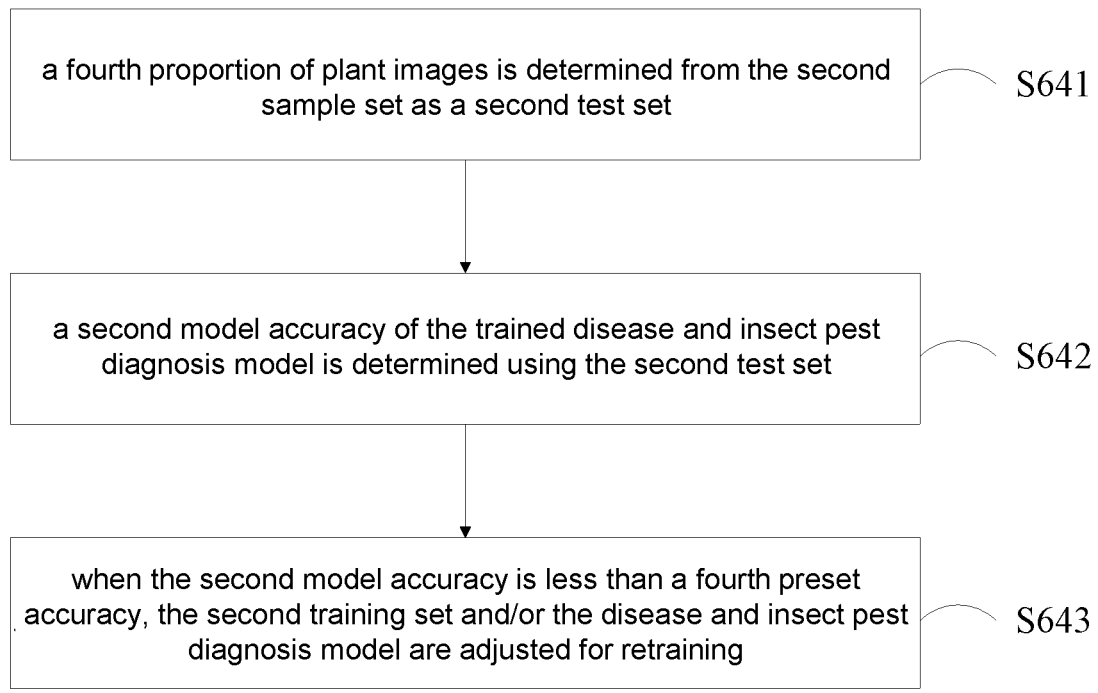
FIG. 5 shows a flowchart of testing a disease and insect pest diagnosis model according to an exemplary embodiment of the disclosure.

Further, the disease and insect pest diagnosis model may also be tested, which may specifically include the following steps, as shown in FIG. 5.

In Step S641, a fourth proportion of plant images is determined from the second sample set as a second test set.

In Step S642, a second model accuracy of the trained disease and insect pest diagnosis model is determined using the second test set.

In Step S643, when the second model accuracy is less than a fourth preset accuracy, the second training set and/or the disease and insect pest diagnosis model are adjusted for retraining.

In general, the plant images in the second test set and the second training set are not exactly the same, so the second test set may be used to test whether the disease and insect pest diagnosis model has a good diagnostic effect on plant images outside the second training set. During the test process, the second model accuracy of the disease and insect pest diagnosis model is calculated through comparing the output diagnosis information generated from the plant images in the second test set with the marked diagnosis information. In some examples, the calculation method of the second model accuracy may be the same as the calculation method of the second training accuracy. When the second model accuracy obtained by the test is less than the fourth preset accuracy, it indicates that the diagnosis effect of the disease and insect pest diagnosis model is not good enough. Therefore, the second training set may be adjusted by specifically, for example, increasing the number of plant images marked with diagnosis information in the second training set, adjusting the disease and insect pest diagnosis model, or adjusting both of the above. Then, the disease and insect pest diagnosis model is retrained to improve the diagnosis effect thereof. In some embodiments, the fourth preset accuracy may be set equal to the third preset accuracy.

Of course, in some embodiments, the recognition of a specie and the diagnosis of a disease and an insect pest may also be implemented by the same pre-trained model, that is, the model may integrate the functions of the specie recognition model and the disease and insect pest diagnosis model.

Returning to FIG. 1, the method for diagnosing the plant disease and the insect pest may also include the following step.

In Step S310, for the candidate specie with the corresponding candidate disease and insect pest information, the candidate disease and insect pest information of the candidate specie is screened out according to the first preset condition.

Generally speaking, in the passive diagnosis mode, the main objective of the user is not to diagnose the disease and insect pest itself, but to, for example, recognize the plant species, etc. In this case, only more accurate and reliable disease and insect pest information may be output, so as to help the user discover the plant disease and insect pest in time while avoiding additional trouble to the user due to inaccurate output of disease and insect pest information. Specifically, less accurate and reliable disease and insect pest information in the candidate disease and insect pest information may be screened out according to the first preset condition.

Specifically, when the candidate specie is determined according to the plant image, it may be determined that there are one or more candidate species. At this time, one or more candidate disease and insect pest information may be determined for each candidate specie, or the candidate disease and insect pest information may be determined only for some candidate species as described above. Further, for each candidate species with corresponding candidate disease and insect pest information, the candidate disease and insect pest information corresponding to the candidate species may be screened out according to the first preset condition.

For example, in a specific example, according to a certain plant image or certain plant images, the determined candidate species include a specie 1, a specie 2, and a specie 3. Then, the specie 1, the specie 2, and the specie 3 may be output to the user in the form of one specie corresponding to one card. The user may switch to display each specie and relevant information corresponding to the specie through swiping cards on an interactive interface, etc. The specie 1, the specie 2, and the specie 3 are arranged in a descending order of specie confidence. For example, the specie confidence of the specie 1 is 0.8, the specie confidence of the specie 2 is 0.75, and the specie confidence of the specie 3 is 0.7. In the passive diagnosis mode, the disease and insect pest information that may be output is determined according to the first preset condition for each specie. When screening out the candidate disease and insect pest information for a certain specie, whether to screen out a certain candidate disease and insect pest information may be determined one by one according to the first preset condition according to the descending order of the diagnostic confidence of the candidate disease and insect pest information of the specie. For example, there are 3 candidate diagnosis information corresponding to the specie 2, and 2 candidate diagnosis information corresponding to the specie 3. If diagnostic confidence of diagnosis information 2-1 is 95%, diagnostic confidence of diagnosis information 2-2 is 90%, and diagnostic confidence of diagnosis information 2-3 is 82%, then during the process of screening out the specie 2, according to the descending order of the diagnostic confidence, the diagnosis information 2-1, the diagnosis information 2-2, and the diagnosis information 2-3 may be screened out in order. If after the diagnosis information 2-1 is screened out, no remaining diagnosis information that may be used for output is found, then the diagnosis information 2-2 is continued to be screened out. If after the diagnosis information 2-1 is screened out, the remaining diagnosis information that may be used for output has been found, then it is not necessary to continue to screen out the diagnosis information 2-2, so as to simplify the entire processing process. Of course, in some cases, after screening out all candidate disease and insect pest information, the remaining disease and insect pest information that may be used for output is still not found, the screening is stopped without outputting any disease and insect pest information.

During the screening process, the first preset conditions involved may be relevant to multiple factors, such as one or more of the diagnostic confidence of the diagnosis, the type of the candidate specie, the diagnostic accuracy of a certain type of disease and insect pest, the degree of matching between the candidate specie and the candidate disease and insect pest information, etc.

In an embodiment, screening out the candidate disease and insect pest information of the candidate specie according to the first preset condition may include the following steps.

In Step S311, whether a candidate specie is in a preset specie set is judged.

In Step S312, when the candidate specie is not in the preset specie set, candidate disease and insect pest information corresponding to the candidate specie is screened out.

Specifically, after the candidate specie and the candidate disease and insect pest information are determined, the screening may be performed first according to the judgment conditions of the embodiment, so as to reduce the amount of data to be processed when screening according to other embodiments described later. The species included in the preset specie set are generally common species or important species, and the diagnosis of diseases and insect pests of the species generally has higher accuracy and reliability. That is to say, in the embodiment, only the disease and insect pest information corresponding to the species may not be screened out and be output, thereby avoiding outputting inaccurate, unreliable, or unimportant disease and insect pest information to the user as much as possible, so as to avoid additional trouble to the user.

In an embodiment, screening out the candidate disease and insect pest information of the candidate specie according to the first preset condition may include the following steps.

Figure 9:
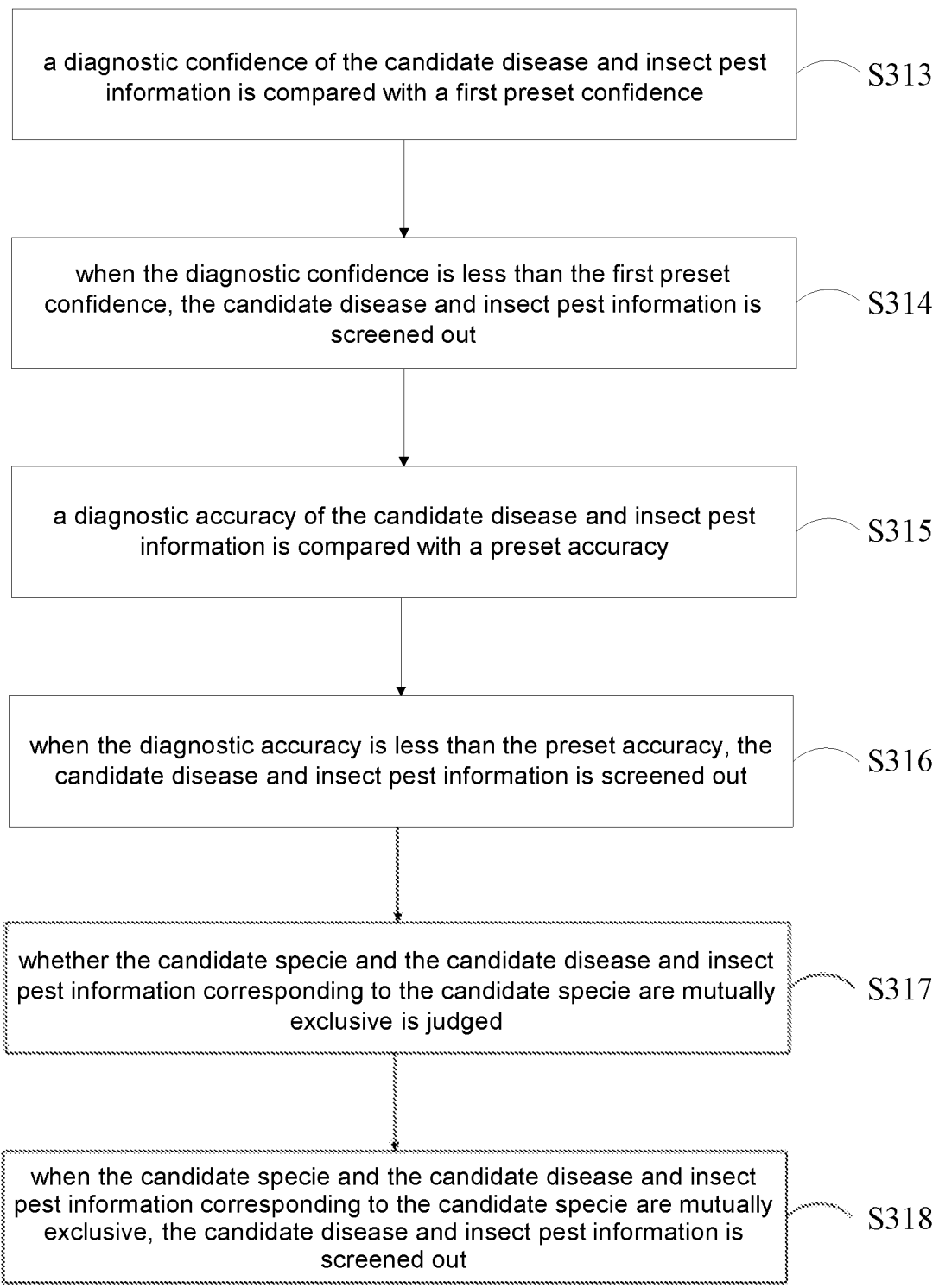
FIG. 9 shows a flowchart of screening out a candidate disease and insect pest information of the candidate specie according to an exemplary embodiment of the disclosure.

In Step S313, a diagnostic confidence of the candidate disease and insect pest information is compared with a first preset confidence, as shown in FIG. 9.

In Step S314, when the diagnostic confidence is less than the first preset confidence, the candidate disease and insect pest information is screened out.

The diagnostic confidence may reflect the reliability of the disease and insect pest information obtained during a single diagnosis. In a specific example, the first preset reliability may be set to 70%. That is to say, when the diagnostic confidence of the candidate disease and insect pest information is less than 70%, the candidate disease and insect pest information is screened out and not output to prevent the output diagnosis information from being inconsistent with the actual situation and causing trouble to the user.

In an embodiment, screening out the candidate disease and insect pest information of the candidate specie according to the first preset condition may include the following steps.

In Step S315, a diagnostic accuracy of the candidate disease and insect pest information is compared with a preset accuracy.

In Step S316, when the diagnostic accuracy is less than the preset accuracy, the candidate disease and insect pest information is screened out.

The diagnostic accuracy reflects the overall accuracy of recognizing a certain type of disease and insect pest. For example, the diagnostic accuracy may be obtained according to a ratio of the number of correct diagnoses to a total number of diagnoses in a certain total number of diagnoses. For some diseases and insect pests that are difficult to diagnose, the diagnostic accuracy is often lower. Therefore, by screening out the candidate disease and insect pest information relevant to the diseases and insect pests, it is possible to avoid outputting inaccurate disease and insect pest information as much as possible.

In an embodiment, screening out the candidate disease and insect pest information of the candidate specie according to the first preset condition may include the following steps.

In Step S317, whether the candidate specie and the candidate disease and insect pest information corresponding to the candidate specie are mutually exclusive is judged.

In Step S318, when the candidate specie and the candidate disease and insect pest information corresponding to the candidate specie are mutually exclusive, the candidate disease and insect pest information is screened out.

For a certain particular specie, the probability of encountering certain types of diseases and insect pests may be zero or very low. Therefore, the candidate disease and insect pest information may be screened out according to the mutually exclusive relationship between such specie and diseases and insect pests to improve the accuracy and reliability of the output.

It should be noted that the above specific methods on how to screen out the candidate disease and insect pest information that satisfies the first preset condition may be combined with each other. For example, in a specific example, as long as the candidate disease and insect pest information satisfies any one of the conditions of the diagnostic confidence being less than the first preset confidence, the candidate specie being not in the preset specie set, the diagnostic accuracy being less than the preset accuracy, and the candidate specie and the candidate disease and insect pest information corresponding to the candidate specie being mutually exclusive, the candidate disease and insect pest information is excluded.

As shown in FIG. 1, the method for diagnosing the plant disease and the insect pest may also include the following step.

In Step S410, after screening out, if there is remaining disease and insect pest information, at least part of the remaining disease and insect pest information is output.

After screening out the candidate disease and insect pest information that satisfies the first preset condition, there may be the following situations.

(1) After screening out, if there is only one remaining disease and insect pest information, the one remaining disease and insect pest information may be directly output for the user to discover the plant disease and the insect pest in time.

(2) After screening out, if there are at least two remaining disease and insect pest information, all remaining disease and insect pest information may be output; or one or more disease and insect pest information may be output in the descending order of the diagnostic confidence in the remaining disease and insect pest information or according to other orders, for the user to discover the plant disease and the insect pest in time. In some cases, it is also possible to output parameters such as the diagnostic confidence corresponding to the output remaining disease and insect pest information at the same time. In other cases, it is also possible to output information on how to deal with the certain disease and insect pest, etc. at the same time. The information includes the treatment method of the disease and insect pest, links to contact information of relevant experts, etc., to help the user make further judgments and treatments.

(3) After screening out, if no remaining disease and insect pest information is screened out, it is not necessary to output any disease and insect pest information considering that the current recognition mode is the passive recognition mode, so as to avoid additional trouble to the user.

Figure 6:
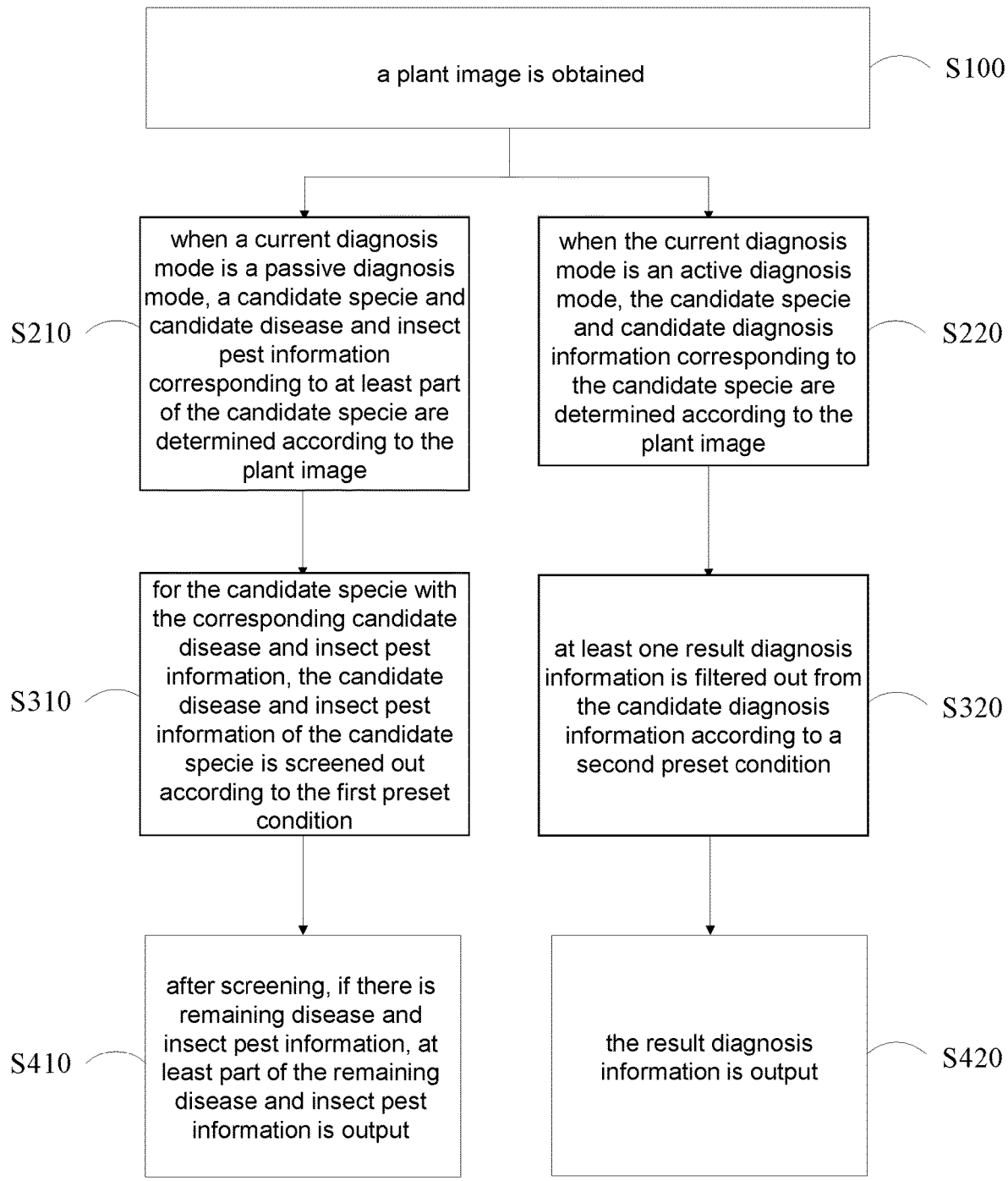
FIG. 6 shows a flowchart of a method for diagnosing a plant disease and an insect pest according to another exemplary embodiment of the disclosure.

In another exemplary embodiment of the disclosure, as shown in FIG. 6, the method for diagnosing the plant disease and the insect pest may further include the following step.

In Step S220, when the current diagnosis mode is an active diagnosis mode, the candidate specie and candidate diagnosis information corresponding to the candidate specie are determined according to the plant image.

Generally speaking, in the active diagnosis mode, the user may have found a problem with the plant and hope to make a diagnosis. Therefore, in the active diagnosis mode, the candidate specie and the candidate diagnosis information corresponding to each candidate specie may be determined according to the plant image, so as to obtain the health status of the plant as comprehensively as possible for the user to perform further analysis and processing. The diagnosis information may include disease and insect pest information or no detected disease and insect pest information.

The candidate specie may be determined through the specie recognition model described above, and the candidate diagnosis information may be determined through the disease and insect pest diagnosis model described above, which will not be repeated here.

Returning to FIG. 6, the method for diagnosing the plant disease and the insect pest may also include the following step.

In Step S320, at least one result diagnosis information is filtered out from the candidate diagnosis information according to a second preset condition.

Compared with the passive diagnosis mode, in the active diagnosis mode, more diagnosis information may be output for user reference, and the requirements for the accuracy and reliability of output diagnosis information may be appropriately reduced.

In the active diagnosis mode, the amount of data involved in the candidate specie and the corresponding candidate diagnosis information may be greater. To simplify processing, filtering out the at least one result diagnosis information from the candidate diagnosis information according to the second preset condition may include the following steps.

Figure 10:
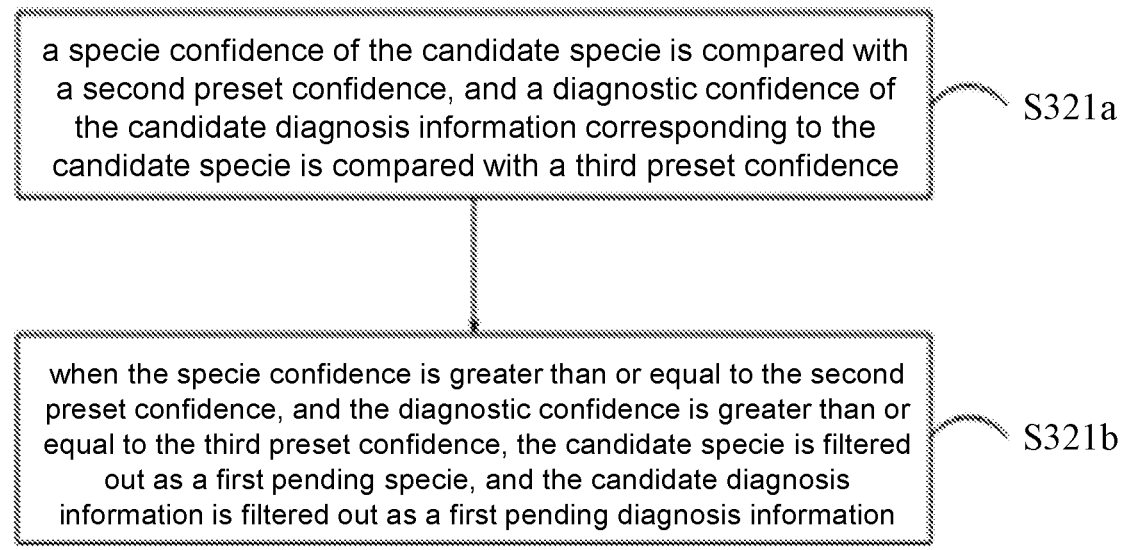
FIG. 10 shows a flowchart of filtering out at least one result diagnosis information from candidate diagnosis information according to an exemplary embodiment of the disclosure.

In Step S321*a*, a specie confidence of the candidate specie is compared with a second preset confidence, and a diagnostic confidence of the candidate diagnosis information corresponding to the candidate specie is compared with a third preset confidence, as shown in FIG. 10.

In Step S321*b*, when the specie confidence is greater than or equal to the second preset confidence, and the diagnostic confidence is greater than or equal to the third preset confidence, the candidate specie is filtered out as a first pending specie, and the candidate diagnosis information is filtered out as a first pending diagnosis information.

That is to say, when filtering out according to the second preset condition, only the candidate specie and the corresponding candidate diagnosis information whose specie confidence is greater than or equal to the second preset confidence and diagnostic confidence is greater than or equal to the third preset confidence are retained, so as to reduce the amount of data to be processed, and improve the accuracy and reliability of the output diagnosis information.

Further, filtering out the at least one result diagnosis information from the candidate diagnosis information according to the second preset condition may also include the following steps.

Figure 11:
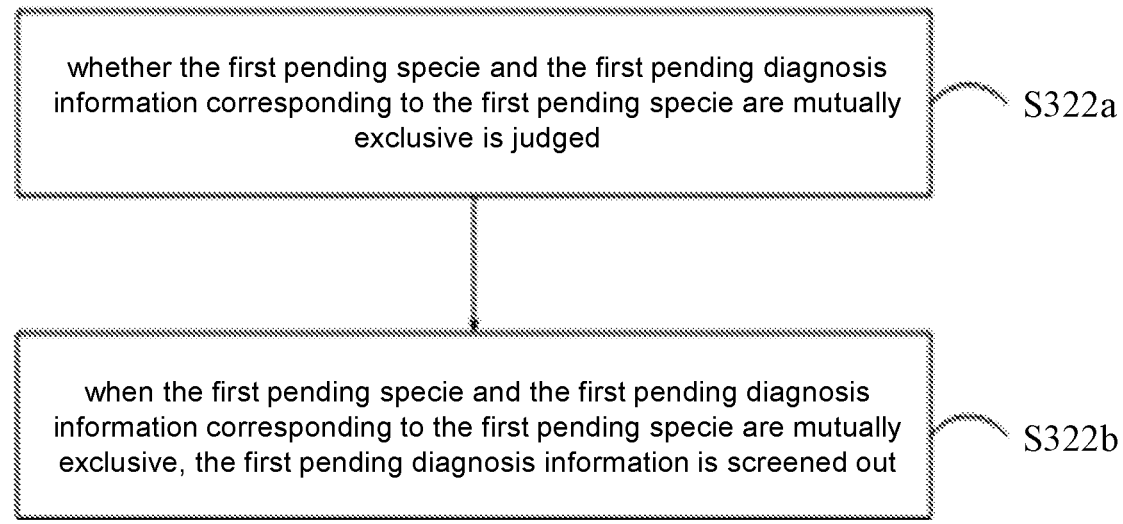
FIG. 11 shows a flowchart of filtering out at least one result diagnosis information from candidate diagnosis information according to another exemplary embodiment of the disclosure.

In Step S322*a*, whether the first pending specie and the first pending diagnosis information corresponding to the first pending specie are mutually exclusive is judged, as shown in FIG. 11.

In Step S322*b*, when the first pending specie and the first pending diagnosis information corresponding to the first pending specie are mutually exclusive, the first pending diagnosis information is screened out.

As mentioned above, for a certain particular specie, there may be zero or only a low probability of encountering certain types of diseases and insect pests. Therefore, the first pending diagnosis information may be further screened out according to the mutually exclusive relationship between such specie and diseases and insect pests. On the one hand, the amount of data to be processed can be reduced and the processing efficiency can be improved. On the other hand, the accuracy and reliability of the output can also be further improved.

In some cases, there may be at least two plant images, and a candidate specie and candidate diagnosis information corresponding to the candidate specie are determined respectively for each plant image. Then, filtering out the at least one result diagnosis information from the candidate diagnosis information according to the second preset condition may include the following steps.

Figure 12:
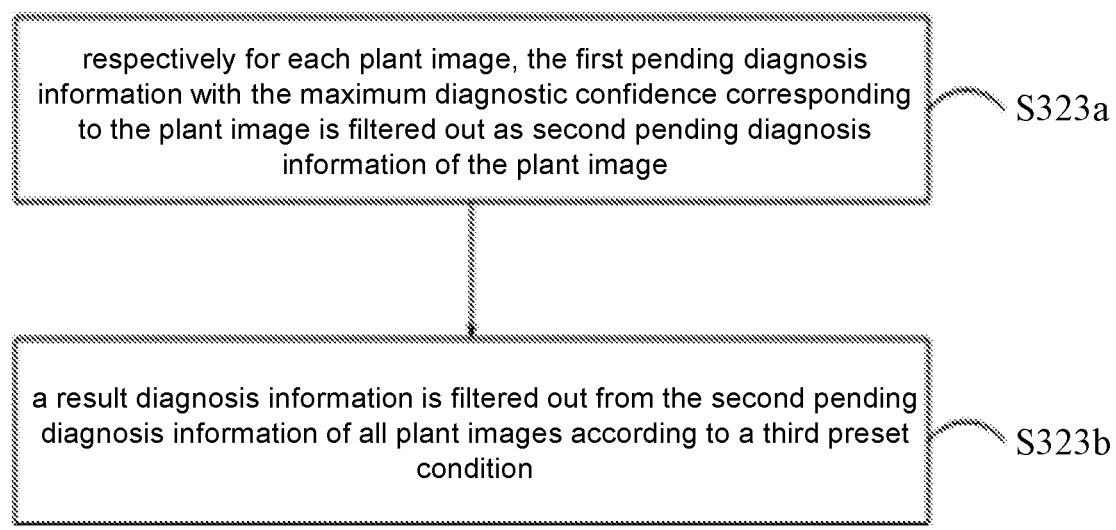
FIG. 12 shows a flowchart of filtering out the at least one result diagnosis information from the candidate diagnosis information according to the other exemplary embodiment of the disclosure.

In Step S323*a*, respectively for each plant image, the first pending diagnosis information with the maximum diagnostic confidence corresponding to the plant image is filtered out as second pending diagnosis information of the plant image, as shown in FIG. 12.

In Step S323*b*, a result diagnosis information is filtered out from the second pending diagnosis information of all plant images according to a third preset condition.

That is to say, respectively for each plant image, the second pending diagnosis information with the maximum diagnostic confidence corresponding to the plant image is filtered out. It should be noted that a part of the diagnosis information in the candidate diagnosis information may have been screened out according to a certain method or certain methods in the embodiments in the active recognition mode described above. Therefore, the diagnostic confidence of the second pending diagnosis information may not be the diagnosis information with the maximum diagnostic confidence in all the candidate diagnosis information corresponding to the plant image. Then, the second pending diagnosis information corresponding to each plant image is summarized, and the result diagnosis information is selected therefrom. The result diagnosis information is generally the diagnosis information with the greatest accuracy and reliability. Specifically, the result diagnosis information may be filtered out by referring to the method for screening out certain diagnosis information according to the first preset condition described above. Alternatively, the result diagnosis information may also be filtered out according to other preset conditions.

Further, the method for diagnosing the plant disease and the insect pest may also include the following step.

In Step S420, the result diagnosis information is output.

The result diagnosis information may be the disease and insect pest information to help the user diagnose the disease and insect pest, and take further corresponding measures. Alternatively, the result diagnosis information may also be no detected disease and insect pest information, which means that the plant is currently in a relatively healthy state. In some cases, it is also possible to output parameters such as the diagnostic confidence corresponding to the output result diagnosis information at the same time. In other cases, it is also possible to output information on how to deal with a certain disease and insect pest corresponding to the result diagnosis information, etc. at the same time. The information includes the treatment method of the disease and insect pest, links to contact information of relevant experts, etc., to help the user make further judgments and treatments.

Figure 7:
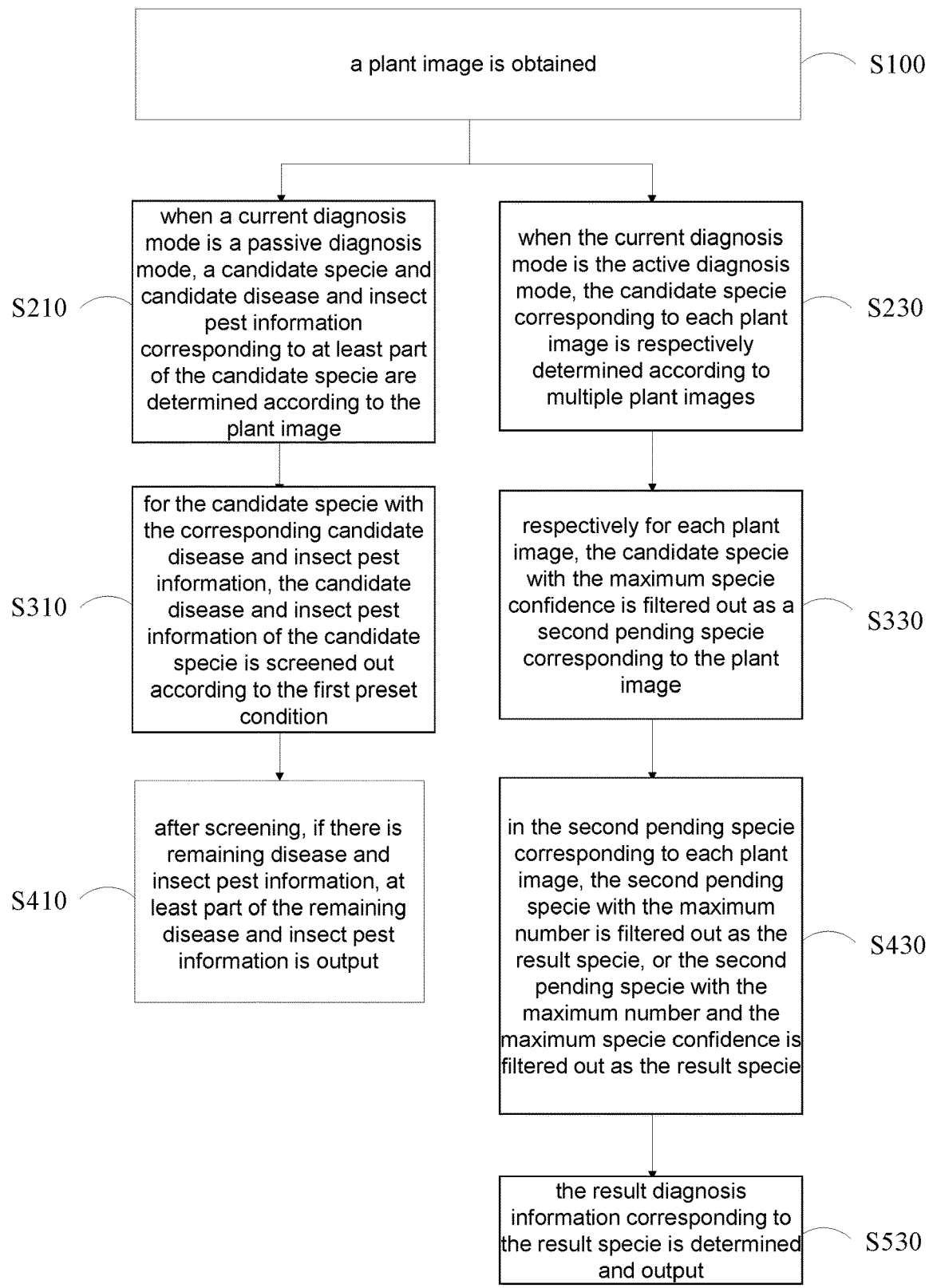
FIG. 7 shows a flowchart of a method for diagnosing a plant disease and an insect pest according to still another exemplary embodiment of the disclosure.

According to another exemplary embodiment of the disclosure, when determining the result diagnosis information, only a result specie may be first determined according to the plant image, and result diagnosis information may be then determined according to the result specie. Specifically, as shown in FIG. 7, the method for diagnosing the plant disease and the insect pest may also include the following steps.

In Step S230, when the current diagnosis mode is the active diagnosis mode, the candidate specie corresponding to each plant image is respectively determined according to multiple plant images.

In Step S330, respectively for each plant image, the candidate specie with the maximum specie confidence is filtered out as a second pending specie corresponding to the plant image.

In Step S430, in the second pending specie corresponding to each plant image, the second pending specie with the maximum number is filtered out as the result specie, or the second pending specie with the maximum number and the maximum specie confidence is filtered out as the result specie.

For example, in one case, if for a plant image A, a plant image B, and a plant image C, in the descending order of the specie confidence, the determined candidate species corresponding to the plant image A include a specie M, a specie N, and a specie P, the candidate species corresponding to the plant image B include a specie N and a specie P, and the candidate species corresponding to the plant image C include a specie N and a specie Q. Then, the filtered out second pending species include the specie M corresponding to the plant image A, the specie N corresponding to the plant image B, and the specie N corresponding to the plant image C. It can be seen that in the second pending specie corresponding to each plant image, the number of the specie M is 1 and the number of the specie N is 2. In this case, the specie N is filtered out as the result specie.

In another case, if for the plant image A, the plant image B, and the plant image C, in the descending order of the specie confidence, the determined candidate species corresponding to the plant image A include the specie M, the specie N, and the specie P, the candidate species corresponding to the plant image B include the specie N and the specie P, and the candidate species corresponding to the plant image C include the specie P and the specie N. Then, the filtered out second pending species include the specie M corresponding to the plant image A, the specie N corresponding to the plant image B, and the specie P corresponding to the plant image C. It can be seen that in the second pending specie corresponding to each plant image, the numbers of the specie M, the specie N, and the specie P are all 1. In this case, the specie with the maximum specie confidence in the specie M, the specie N, and the specie P is filtered out as the result specie. For example, if the specie confidence of the specie M is greater than the specie confidence of the specie N, and the specie confidence of the specie N is greater than the specie confidence of the specie P, then the specie M is filtered out as the result specie.

Returning to FIG. 7, the method for diagnosing the plant disease and the insect pest may also include the following step.

In Step S530, the result diagnosis information corresponding to the result specie is determined and output.

In other words, on the premise that the result specie is determined, the result diagnosis information corresponding to the result specie is further determined and output.

Specifically, after determining the result specie, the disease and insect pest diagnosis model may be used to generate the candidate diagnosis information for the plant image based on the result specie. Then, the candidate diagnosis information is filtered out according to the first preset condition, the second preset condition, or the third preset condition described above, thereby obtaining the result diagnosis information for output.

The result diagnosis information may be the disease and insect pest information to help the user diagnose the disease and insect pest and take further corresponding measures. Alternatively, the result diagnosis information may also be no detected disease and insect pest information, which means that the plant is currently in a relatively healthy state. In some cases, it is also possible to output parameters such as the diagnostic confidence corresponding to the output result diagnosis information at the same time. In other cases, it is also possible to output information on how to deal with a certain disease and insect pest corresponding to the result diagnosis information, etc. at the same time. The information includes the treatment method of the disease and insect pest, links to contact information of relevant experts, etc., to help the user make further judgments and treatments.

Figure 8:
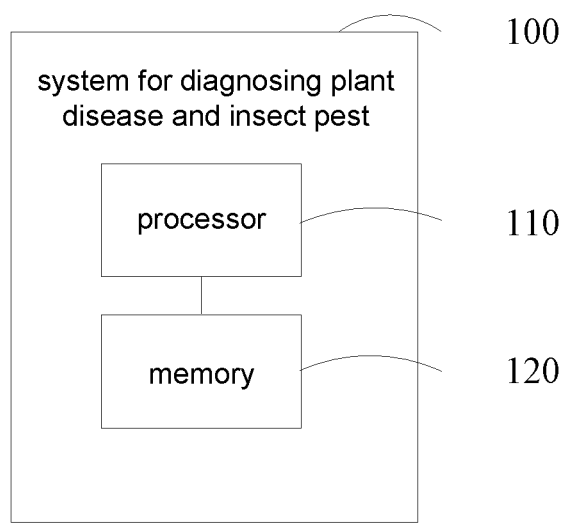
FIG. 8 shows a block diagram of a system for diagnosing a plant disease and an insect pest according to an exemplary embodiment of the disclosure.

According to another aspect of the disclosure, a system for diagnosing a plant disease and an insect pest is also provided. As shown in FIG. 8, a system for diagnosing a plant disease and an insect pest 100 may include a processor 110 and a memory 120. The memory 120 stores an instruction. When the instruction is executed by the processor 110, the steps in the method for diagnosing the plant disease and the insect pest described above may be implemented.

The processor 110 may execute various actions and processing according to instruction stored in the memory 120. Specifically, the processor 110 may be an integrated circuit chip with signal processing capability. The processor may be a general-purpose processor, a digital signal processor (DSP), an application specific integrated circuit (ASIC), a field programmable gate array (FPGA), or other programmable logic devices, discrete gate or transistor logic devices, or discrete hardware components, which may implement or execute various methods, steps, and logic block diagrams in the embodiments of the disclosure. The general-purpose processor may be a microprocessor, any conventional processor, etc., and may have an x86 architecture, an advanced RISC machine (ARM) architecture, etc.

The memory 120 stores an executable instruction, which is executed by the processor 110 in the method for diagnosing the plant disease and the insect pest. The memory 120 may be a volatile memory, a non-volatile memory, or may include both volatile and non-volatile memories. The non-volatile memory may be read-only memory (ROM), programmable read-only memory (PROM), erasable programmable read-only memory (EPROM), electrically erasable programmable read-only memory (EEPROM), or flash memory. The volatile memory may be random-access memory (RAM), which is used as an external cache. Through exemplary but not limiting descriptions, many forms of the RAM are available, such as a static random-access memory (SRAM), a dynamic random-access memory (DRAM), a synchronous dynamic random-access memory (SDRAM), a double data rate synchronous dynamic random-access memory (DDRSDRAM), an enhanced synchronous dynamic random-access memory (ESDRAM), a synchronous link dynamic random-access memory (SLDRAM), and a direct rambus random-access memory (DR RAM). It should be noted that the memory of the method described herein is intended to include, but is not limited to, the above and any other appropriate types of memory.

According to another aspect of the disclosure, a computer-readable storage medium (e.g. a non-transitory computer-readable storage medium) is provided. The computer-readable storage medium stores an instruction. When the instruction is executed by a processor, the steps in the method for diagnosing the plant disease and the insect pest may be implemented.

Similarly, the computer-readable storage medium in the embodiments of the disclosure may be a volatile memory, a non-volatile memory, or may include both volatile and non-volatile memory. It should be noted that the computer-readable storage medium described herein is intended to include, but is not limited to, the above and any other appropriate types of memory.

It should be noted that the flowcharts and block diagrams in the drawings illustrate the possible system architectures, functions, and operations that may be implemented by the systems, methods, and computer program products according to the various embodiments of the disclosure. In this regard, each block in the flowcharts or block diagrams may represent a module, a program segment, or a part of a code. The module, the program segment, or the part of the code contains one or more executable instructions for implementing specified logic functions. It should also be noted that, in some alternative implementations, the functions marked in the blocks may also occur in an order different from the order marked in the drawings. For example, two blocks shown in succession may actually be executed basically in parallel, or sometimes be executed in the reverse order, which depends on the functions involved. It should also be noted that each block in the block diagrams and/or flowcharts, and a combination of blocks in the block diagrams and/or flowcharts may be implemented by a dedicated hardware-based system for executing the specified functions or operations, or may be implemented by a combination of dedicated hardware and computer instructions.

Generally speaking, the various exemplary embodiments of the disclosure may be implemented in hardware or special purpose circuits, software, firmware, logic, or any combination thereof. Certain aspects may be implemented in hardware while other aspects may be implemented in firmware or software that may be executed by a controller, a microprocessor, or other computing equipment. When various aspects of the embodiments of the disclosure are illustrated or described as block diagrams, flowcharts, or represented using certain other graphics, it is understood that the blocks, devices, systems, techniques, or methods described herein may be regarded as non-limiting examples implemented in hardware, software, firmware, dedicated circuits or logic, general-purpose hardware or controllers, other computing equipment, or certain combinations thereof.

Terms such as "front", "rear", "top", "bottom", "above", and "below", if present, in the specification and claims are used for descriptive purposes and are not necessarily used to describe unchanging relative positions. It should be understood that such terms are interchangeable under appropriate circumstances, so that the embodiments of the disclosure described herein, for example, can be operated in other orientations different from the orientations shown herein or otherwise described.

As used herein, the term "exemplary" means "serving as an example, an instance, or an illustration", instead of a "model" to be copied exactly. Any implementation described exemplarily herein is not necessarily interpreted as being preferred or advantageous over other implementations. Moreover, the disclosure is not limited by any expressed or implied theory given in the above technical field, description of related art, summary, or detailed description of disclosed embodiments.

As used herein, the term "substantially" means to include any minor changes caused by design or manufacturing defects, device or element tolerances, environmental influences, and/or other factors. The term "substantially" also allows for differences with the perfect or ideal situation caused by parasitic effects, noise, and other practical considerations that may be present in the actual implementation.

In addition, the foregoing descriptions may have stated elements, nodes, or features that are "connected" or "coupled" together. As used herein, unless expressly stated otherwise, "connected" means that one element/node/feature is directly connected (or directly communicated) to another element/node/feature electrically, mechanically, logically, or in other ways. Similarly, unless expressly stated otherwise, "coupled" means that one element/node/feature may be directly or indirectly connected to another element/node/feature mechanically, electrically, logically or in other ways to allow mutual interaction, even if the two features may not be directly connected. In other words, "coupled" is intended to include direct connection and indirect connection between elements or other features, including the connection using one or more intermediate elements.

In addition, for the purpose of reference only, similar terms such as "first", "second", etc. may also be used herein, which are not intended to be limiting. For example, unless expressly indicated by the context, the terms "first", "second", and other such numerical words referring to structures or elements do not imply a sequence or order.

It should also be understood that when the term "including/comprising" is used in the text, it indicates that the specified feature, whole, step, operation, unit, and/or component is present, but does not exclude the presence or addition of one or more other features, wholes, steps, operations, units, components, and/or combinations thereof.

In the disclosure, the term "provide" is used in a broad sense to cover all the ways to obtain an object. Therefore, "providing a certain object" includes, but is not limited to, "purchasing", "preparing/manufacturing", "arranging/disposing", "installing/assembling", and/or "ordering" the object, etc.

Although some specific embodiments of the disclosure have been described in detail through examples, persons skilled in the art should understand that the above examples are only for illustration and not for limiting the scope of the disclosure. The various embodiments disclosed herein may be combined arbitrarily without departing from the spirit and scope of the disclosure. Persons skilled in the art should also understand that various modifications may be made to the embodiments without departing from the scope and spirit of the disclosure. The scope of the disclosure is defined by the appended claims.

What is claimed is:

1. A method for diagnosing a plant disease and an insect pest, comprising:
   obtaining a plant image;
   determining a candidate specie and candidate disease and insect pest information corresponding to at least part of the candidate specie according to the plant image when a current diagnosis mode is a passive diagnosis mode;
   screening out the candidate disease and insect pest information of the candidate specie according to a first preset condition for the candidate specie with the corresponding candidate disease and insect pest information; and
   outputting at least part of remaining disease and insect pest information after screening out when there is the remaining disease and insect pest information;
   wherein determining the candidate specie according to the plant image comprises:
   determining the candidate specie according to the plant image using a trained specie recognition model,
   wherein the trained specie recognition model is at least one of a convolutional neural network model and a residual network model;
   wherein training a specie recognition model comprises:
   obtaining a first sample set of plant images marked with specie of a first preset number;
   determining a first proportion of plant images from the first sample set as a first training set;
   training the specie recognition model using the first training set; and
   obtaining the trained specie recognition model as training ends when a first training accuracy is greater than or equal to a first preset accuracy.

2. The method according to claim 1, wherein determining the candidate specie and the candidate disease and insect pest information corresponding to the at least part of the candidate specie according to the plant image comprises:
   judging whether the candidate specie is in a preset specie set;
   determining the candidate disease and insect pest information corresponding to the candidate specie according to the plant image and the candidate specie when the candidate specie is in the preset specie set; and
   not determining the candidate disease and insect pest information corresponding to the candidate specie for the candidate specie when the candidate specie is not in the preset specie set.

3. The method according to claim 1, wherein screening out the candidate disease and insect pest information of the candidate specie according to the first preset condition comprises:
   screening out the candidate disease and pest information of the candidate specie according to the first preset condition, according to a descending order of diagnostic confidence of the candidate disease and insect pest information, when there are at least two candidate disease and insect pest information corresponding to the same candidate specie until the remaining disease and insect pest information for output is filtered out or all of the candidate disease and insect pest information corresponding to the candidate specie is screened out.

4. The method according to claim 1, wherein screening out the candidate disease and insect pest information of the candidate specie according to the first preset condition comprises:
   judging whether the candidate specie is in a preset specie set; and
   screening out the candidate disease and insect pest information corresponding to the candidate specie when the candidate specie is not in the preset specie set.

5. The method according to claim 1, wherein screening out the candidate disease and insect pest information of the candidate specie according to the first preset condition comprises:
   comparing a diagnostic confidence of the candidate disease and insect pest information with a first preset confidence; and
   screening out the candidate disease and insect pest information when the diagnostic confidence is less than the first preset confidence.

6. The method according to claim 1, wherein screening out the candidate disease and insect pest information of the candidate specie according to the first preset condition comprises:
   comparing a diagnostic accuracy of the candidate disease and insect pest information with a preset accuracy; and
   screening out the candidate disease and insect pest information when the diagnostic accuracy is less than the preset accuracy.

7. The method according to claim 1, wherein screening out the candidate disease and insect pest information of the candidate specie according to the first preset condition comprises:
   judging whether the candidate specie and the candidate disease and insect pest information corresponding to the candidate specie are mutually exclusive; and
   screening out the candidate disease and insect pest information when the candidate specie and the candidate disease and insect pest information corresponding to the candidate specie are mutually exclusive.

8. The method according to claim 1, further comprising:
   determining the candidate specie and candidate diagnosis information corresponding to the candidate specie according to the plant image when the current diagnosis mode is an active diagnosis mode, wherein the candidate diagnosis information comprises disease and insect pest information or no detected disease and insect pest information;
   filtering out at least one result diagnosis information from the candidate diagnosis information according to a second preset condition; and
   outputting the result diagnosis information.

9. The method according to claim 8, wherein filtering out the at least one result diagnosis information from the candidate diagnosis information according to the second preset condition comprises:
   comparing a specie confidence of the candidate specie with a second preset confidence and comparing a diagnostic confidence of the candidate diagnosis information corresponding to the candidate specie with a third preset confidence; and
   filtering out the candidate specie as a first pending specie and filtering out the candidate diagnosis information as first pending diagnosis information when the specie confidence is greater than or equal to the second preset confidence, and the diagnostic confidence is greater than or equal to the third preset confidence.

10. The method according to claim 9, wherein filtering out the at least one result diagnosis information from the candidate diagnosis information according to the second preset condition comprises:
    judging whether the first pending specie and the first pending diagnosis information corresponding to the first pending specie are mutually exclusive; and
    screening out the first pending diagnosis information when the first pending specie and the first pending diagnosis information corresponding to the first pending specie are mutually exclusive.

11. The method according to claim 10, wherein there are at least two plant images, and the candidate specie and the candidate diagnosis information corresponding to the candidate specie are determined according to each of the plant images; and
    filtering out the at least one result diagnosis information from the candidate diagnosis information according to the second preset condition comprises:
    filtering out the first pending diagnosis information with a maximum diagnostic confidence corresponding to the plant image as second pending diagnosis information of the plant image respectively for each of the plant images; and
    filtering out the result diagnosis information from the second pending diagnosis information of all of the plant images according to a third preset condition.

12. The method according to claim 1, further comprising:
    respectively determining the candidate specie corresponding to each of a plurality of plant images according to the plant images when the current diagnosis mode is an active diagnosis mode;
    filtering out the candidate specie with a maximum specie confidence as a second pending specie corresponding to the plant image respectively for each of the plant images;
    filtering out the second pending specie with a maximum number as a result specie or filtering out the second pending specie with the maximum number and a maximum specie confidence as the result specie in the second pending specie corresponding to each of the plant images; and
    determining and outputting result diagnosis information corresponding to the result specie.

13. The method according to claim 1, further comprising:
    determining a second proportion of plant images from the first sample set as a first test set;
    determining a first model accuracy of the trained specie recognition model using the first test set; and
    adjusting the first training set and/or the specie recognition model for retraining when the first model accuracy is less than a second preset accuracy.

14. The method according to claim 1, wherein determining the candidate disease and insect pest information according to the plant image comprises:
    determining candidate diagnosis information according to the plant image using a trained disease and insect pest diagnosis model; and
    obtaining the candidate disease and insect pest information according to the candidate diagnosis information,
    wherein the trained disease and insect pest diagnosis model is a neural network model.

15. The method according to claim 14, wherein training a disease and insect pest diagnosis model comprises:
    obtaining a second sample set of plant images marked with diagnosis information of a second preset number;
    determining a third proportion of plant images from the second sample set as a second training set;
    training the disease and insect pest diagnosis model using the second training set; and
    obtaining the trained disease and insect pest diagnosis model as training ends when a second training accuracy is greater than or equal to a third preset accuracy.

16. The method according to claim 15, further comprising:
    determining a fourth proportion of plant images from the second sample set as a second test set;
    determining a second model accuracy of the trained disease and insect pest diagnosis model using the second test set; and
    adjusting the second training set and/or the disease and insect pest diagnosis model for retraining when the second model accuracy is less than a fourth preset accuracy.

17. A system for diagnosing a plant disease and an insect pest, comprising a processor and a memory, wherein the memory stores an instruction, and when the instruction is executed by the processor, the steps of the method according to claim 1 are implemented.

18. A non-transitory computer-readable storage medium, storing an instruction, wherein when the instruction is executed by a processor, the steps of the method according to claim 1 are implemented.

* * * * *